(12) United States Patent
Kratschmer et al.

(10) Patent No.: US 6,740,714 B2
(45) Date of Patent: May 25, 2004

(54) POLYCARBONATE BLENDS

(75) Inventors: Silke Kratschmer, Krefeld (DE); Klaus Horn, Dormagen (DE); Michael Erkelenz, Duisburg (DE)

(73) Assignee: Bayer Aktiengesellschaft, Leverkusen (DE)

( * ) Notice: Subject to any disclaimer, the term of this patent is extended or adjusted under 35 U.S.C. 154(b) by 20 days.

(21) Appl. No.: 10/196,874

(22) Filed: Jul. 17, 2002

(65) Prior Publication Data

US 2003/0040586 A1 Feb. 27, 2003

(30) Foreign Application Priority Data

Jul. 20, 2001 (DE) .......................... 101 35 465

(51) Int. Cl.$^7$ .............................................. C08L 69/00
(52) U.S. Cl. ...................... 525/469; 525/462; 528/204
(58) Field of Search ................ 525/462, 469; 528/204

(56) References Cited

U.S. PATENT DOCUMENTS

| | | | |
|---|---|---|---|
| 5,286,834 A | 2/1994 | Sakashita et al. | 528/198 |
| 5,401,826 A | 3/1995 | Sakashita et al. | 528/204 |
| 5,470,938 A | 11/1995 | Sakashita et al. | 528/198 |
| 5,532,324 A | 7/1996 | Sakashita et al. | 525/462 |
| 2002/0120092 A1 | 8/2002 | Kratschmer et al. | 528/196 |
| 2002/0123567 A1 | 9/2002 | Warth et al. | 525/67 |

FOREIGN PATENT DOCUMENTS

| | | | |
|---|---|---|---|
| CA | 2306157 | * | 4/1999 |
| DE | 19646401 | * | 5/1998 |
| DE | 100 47 483 | | 4/2002 |
| JP | 07-199488 | * | 8/1995 |

\* cited by examiner

Primary Examiner—David J. Buttner
(74) Attorney, Agent, or Firm—Joseph C. Gil; Gary F. Matz; Aron Preis

(57) ABSTRACT

A thermoplastic molding composition suitable for making articles having good combination of properties is disclosed. The composition contains (A) a copolycarbonate derived from compounds of formula (I)

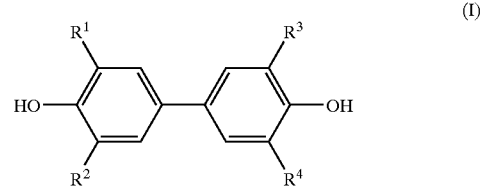

wherein $R^1$ to $R^4$ independently of one another represent H, $C_1$–$C_4$-alkyl, phenyl, substituted phenyl or halogen, and compounds of formula (II)

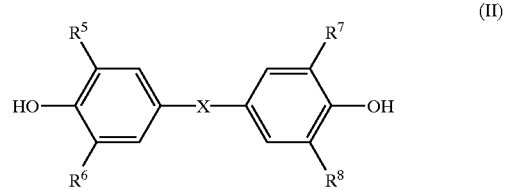

wherein $R^5$ to $R^8$ independently of the others denote H, $CH_3$, Cl or Br and X is $C_1$–$C_5$-alkylene, $C_2$–$C_5$-alkylidene, $C_5$–$C_6$-cycloalkylene, $C_5$–$C_{10}$-cycloalkylidene, and (B) a homopolycarbonate derived from bisphenol A. The composition that features resistance to stress cracking and good low-temperature properties is suitable for automotive construction and exterior applications.

5 Claims, No Drawings

POLYCARBONATE BLENDS

FIELD OF THE INVENTION

The present invention relates to thermoplastic molding compositions and in particular to compositions containing polycarbonate resins.

SUMMARY OF THE INVENTION

A thermoplastic molding composition suitable for making articles having good combination of properties is disclosed. The composition contains
(A) a copolycarbonate derived from compounds of formula (I)

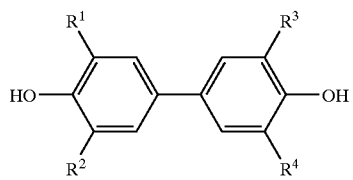

wherein $R^1$ to $R^4$ independently of one another represent H, $C_1$–$C_4$-alkyl, phenyl, substituted phenyl or halogen, and compounds of formula (II)

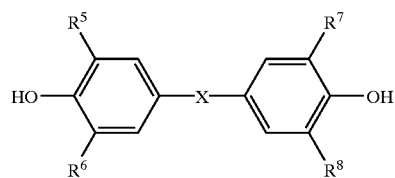

wherein $R^5$ to $R^8$ independently of the others denote H, $CH_3$, Cl or Br and X is $C_1$–$C_5$-alkylene, $C_2$–$C_5$-alkylidene, $C_5$–$C_6$-cycloalkylene, $C_5$–$C_{10}$-cycloalkylidene, and (B) a homopolycarbonate derived from bisphenol A. The composition that features resistance to stress cracking and good low-temperature properties is suitable for automotive construction and exterior applications.

BACKGROUND OF THE INVENTION

For automotive construction and other exterior applications, polycarbonates have long been sought that are as resistant as possible to chemicals and are preferably transparent and that are both resistant to low temperatures and are thermally stable. Transparent polycarbonates are therefore required that exhibit improved low-temperature strength compared with polycarbonate of pure 2,2-bis(4-hydroxyphenyl)propane, and have increased thermal stability, while having improved stress cracking behavior.

Copolycarbonates based on 4,4'-dihydroxydiphenyl and 2,2-bis(4-hydroxyphenyl)propane are already known from JP-A 5117382 and have been described in EP-A1 0 544 407, U.S. Pat. No. 5,470,938, U.S. Pat. No. 5,532,324 and U.S. Pat. No. 5,401,826 as being particularly resistant to chemicals, resistant to heat and flame retardant, while having the same mechanical properties and transparency as commercially available polycarbonate of pure bisphenol.

German Patent Application DE 10047483.7 describes copolycarbonates of 4,4'-dihydroxydiphenyl and 2,2-bis(4-hydroxyphenyl)propane (bisphenol A) that exhibit particularly good low-temperature properties. However, it is also described that the good low-temperature properties diminish as the content of 4,4'-dihydroxydiphenyl falls. Since 4,4'-dihydroxydiphenyl is an expensive component in comparison with 2,2-bis(4-hydroxyphenyl)propane, it is desirable for reasons of cost to keep the 4,4'-dihydroxydiphenyl content as low as possible, without losing the desired improvement in the low-temperature strength.

The object was, therefore, to reduce the amount of 4,4'-dihydroxydiphenyl (DOD), or compounds of formula (I), necessary to prepare a particular amount of the polycarbonate, without thereby losing the desired properties of the polycarbonate.

Surprisingly, it has now been found that it is possible to produce blends of copolycarbonates containing DOD, or compounds of formula (I), and polycarbonate of pure bisphenol A that exhibit the desired properties of the copolycarbonate (A) unchanged, while the amount of DOD or compounds of formula (I), based on the amount of end product, is reduced.

That is particularly astonishing given that it is generally not possible when producing blends to predict what properties a blend will ultimately have. The properties of the starting polymers may be enhanced, eliminated, may change (in either direction), and in some cases the starting polymers may not even be miscible homogeneously, etc. In short, no prediction is possible and a result like the present result is in no way obvious but, on the contrary, is highly surprising.

DETAILED DESCRIPTION OF THE INVENTION

Accordingly, the present invention relates to a thermoplastic molding composition containing (A)1 to 99 wt. % of copolycarbonate derived from 0.1 mol % to 46 mol %, preferably from 11 mol % to 34 mol % and especially from 26 mol % to 34 mol %, of compounds of formula (I)

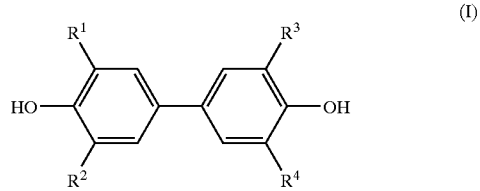

wherein $R^1$, $R^2$, $R^3$ and $R^4$ independently of one another represents H, $C_1$–$C_4$-alkyl, phenyl, substituted phenyl or halogen, preferably H, $C_1$–$C_4$-alkyl or halogen, and particularly preferably all represent the same radical, especially H or tert-butyl, and complementary amounts, that is from 99.9 mol % to 54 mol %, preferably from 89 mol % to 66 mol % and especially from 74 mol % to 66 mol %, of compounds of formula (II)

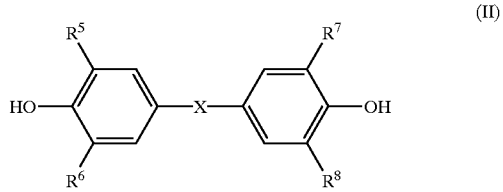

wherein $R^5$, $R^6$, $R^7$ and $R^8$ independently one of the others denote H, $CH_3$, Cl or Br and X is $C_1$–$C_5$-alkylene, $C_2$–$C_5$- alkylidene, $C_5$–$C_6$-cycloalkylene, $C_5$–$C_{10}$-cycloalkylidene, as bisphenol monomers, and (B) 1 to 99 wt. % of a bisphenol A-derived homopolycarbonate.

The molding composition is suitable for use in fields in which particularly good low-temperature properties are sought. Preferred mixtures of the copolymer (A) with polycarbonate (B) are from 30 to 95 wt. % of (A), very particularly preferably from 40 to 95 wt. % of (A), with correspondingly complementary amounts of polycarbonate (B).

Mixtures of polycarbonate (B) with copolycarbonates (A) in which the copolycarbonates (A) is present in amounts of 34 to 26 mol %, especially from 33 to 27 mol %, more especially from 32 to 28 mol %, very especially from 31 to 29 mol % and most especially 30 mol % of bisphenol monomer of formula (I), in each case supplemented by a complementary content of bisphenol monomer of formula (II), are very particularly preferred, and the invention relates thereto.

The indicated percentages of the bisphenol monomers relate to the total content of bisphenols in the polycarbonates, defined on the basis of 100%. Component B is a homopolycarbonate derived from bisphenol A.

Blends that have the compositions mentioned as being preferred, particularly preferred or very particularly preferred are preferred, particularly preferred or very particularly preferred.

The definitions, relative proportions and explanations given above in general or within the scope of preferences may, however, also be combined with one another as desired, that is to say between the respective ranges and preferred ranges. They apply correspondingly to end products as well as to preliminary and intermediate products.

Surprisingly, it has now been found that the polycarbonate blends according to the invention have good low-temperature properties. That is especially surprising because blends derived from only a small amount of bisphenol monomer (I) exhibit better low-temperature properties than the corresponding pure copolycarbonates (A) derived from the same amount of (I).

The blends may therefore be used to make molded articles wherever the properties profile of the polycarbonates known hitherto is inadequate, especially, for example, in the electrical sector and in the construction sector, for coverings or glazing, especially in the automotive sector as films, sheets, fittings or housing parts, but also in the optical field as lenses and data storage means, and also as commodity goods, and when increased dimensional stability under heat or chemical resistance are required at the same time as good low-temperature properties. In addition, they may also replace other materials in applications in which conventional polycarbonates could hitherto not be used because their low-temperature properties were not adequate therefor.

According to the invention, good low-temperature properties are to be understood as meaning, for example, without being limited thereto, good low-temperature strength, since conventional polycarbonates become brittle at low temperatures and thus tend to break and tear.

According to the invention, low temperatures are to be understood as being temperatures below 0° C., particularly preferably below −10° C., particularly preferably below −20° C., very particularly preferably below −30° C., especially below −40° C. and very especially below −50° C.

Preferred compounds of formula (I) are 4,4'-dihydroxydiphenyl (DOD) and 4,4'-dihydroxy-3,3',5,5'-tetra(tert-butyl)diphenyl, 4,4'-dihydroxy-3,3',5,5'-tetra(n-butyl) diphenyl and 4,4'-dihydroxy-3,3',5,5'-tetra(methyl)diphenyl, with 4,4'-dihydroxydiphenyl being particularly preferred.

Preferred compounds of formula (II) are 2,2-bis(4-hydroxyphenyl)propane, 1,1-bis(4-hydroxyphenyl)-3,3,5-trimethylcyclohexane and 1,3-bis[2-(4-hydroxyphenyl)-2-propyl]benzene, 1,1-bis(4-hydroxyphenyl)-1-phenylethane, 1,1-bis(4-hydroxyphenyl)-cyclohexane, especially 2,2-bis(4-hydroxyphenyl)propane (bisphenol A) and 1,1-bis(4-hydroxyphenyl)-3,3,5-trimethylcyclohexane (bisphenol TMC), very particularly preferably 2,2-bis(4-hydroxyphenyl)propane (bisphenol A).

The copolycarbonate (A) may be derived from one or more compounds of formula (I).

Likewise, (A) may be derived from one or more compounds of formula (II).

The preparation of (co)polycarbonates is known.

For the preparation of polycarbonates by the interfacial process or the melt transesterification process, reference is made, for example, to "Schnell", Chemistry and Physics of Polycarbonates, Polymer Reviews, Vol. 9, Interscience Publishers, New York, London, Sydney 1964, p. 33 ff and to Polymer Reviews, Volume 10, "Condensation Polymers by Interfacial and Solution Methods", Paul W. Morgan, Interscience Publishers, New York 1965, Chap. VIII, p. 325 and EP-A 971790.

According to DE-A 2 119 779, the preparation of copolycarbonates involving compounds of formula (I) takes place preferably in solution, namely by the interfacial process and the process in homogeneous phase. Preparation thereof by the known polycarbonate preparation process in the melt (so-called melt transesterification process) is also possible, which process is described, for example, in DE-A 19 64 6401 or in DE-A 1 42 38 123. Transesterification processes (acetate process and phenyl ester process) are also described, for example, in U.S. Pat. Nos. 3,494,885, 4,386,186, 4,661, 580, 4,680,371 and 4,680,372, in EP-A 26120, 26121, 26684, 28030, 39845, 91602, 97970, 79075, 146887, 156103, 234913 and 240301 as well as in DE-A 1495626 and 2232977.

Copolycarbonate (A) and homopolycarbonate (B) may contain impurities caused by the synthesis. A high degree of purity is, however, desirable and is preferably sought.

The polycarbonate and copolycarbonate according to the invention may contain structural units derived from any of a variety of end groups. These end groups are introduced as chain terminators. Chain terminators within the scope of the invention are those of formula (III)

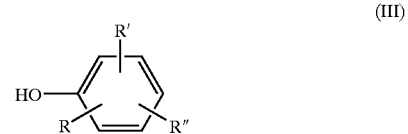

(III)

wherein R, R' and R" may each independently of the others represent H, optionally branched $C_1$–$C_{34}$-alkyl/cycloalkyl, $C_7$–$C_{34}$-alkaryl or $C_6$–$C_{34}$-aryl, for example butylphenol, tritylphenol, cumylphenol, phenol, octylphenol, preferably butylphenol or phenol. The chain terminators used in the making of copolycarbonate (A) may be either the same as or different from the ones used in the preparation of polycarbonate (B).

The individual components (A) and (B) may, independently of each other, contain small amounts of from 0.02 to 3.6 mol % (based on the dihydroxy compound) of branching agents. Suitable branching agents are the compounds suitable for the preparation of polycarbonates and having three or more functional groups, preferably those having three or more phenolic OH groups, for example 1,1,1-tri-(4-hydroxyphenyl)ethane and isatin biscresol.

In order to alter the properties, auxiliary substances and reinforcing agents may be added to the polycarbonate blends according to the invention. These include thermal stabilizers and UV stabilizers, flow modifiers, mold-release agents, flame retardants, pigments, finely divided minerals, fibrous substances, for example alkyl and aryl phosphites, phosphates, phosphanes, low molecular weight carboxylic acid esters, halogen compounds, salts, chalk, quartz powder, glass fibers and carbon fibers, pigments and combinations thereof. Such compounds are described, for example, in WO 99/55772, p. 15–25, and in "Plastics Additives", R. Gächter and H. Müller, Hanser Publishers 1983.

Other polymers, for example polyolefins, polyurethanes, polyesters, acrylonitrile-butadiene-styrene and polystyrene, may also be mixed with the components of the inventive composition.

Such substances are preferably added to the finished (co)polycarbonate in conventional apparatuses, but, depending on requirements, they may also be added at a different stage of the preparation process.

The components (A) and (B) may have molecular weights (weight-average molecular weight) of 10,000 to 60,000, preferably 20,000 to 55,000, determined by measurement of the relative solution viscosity in dichloromethane or in mixtures of equal amounts by weight of phenol/o-dichlorobenzene, calibrated by light scattering. They may already contain additives or stabilizers, such as may also be added to the blends according to the invention.

The present Application relates also to the polycarbonate blends according to the invention themselves.

The polycarbonate blends according to the invention are thermoplastically processable in the conventional manner at temperatures of 240° C. to 380° C., preferably 260° C. to 360° C. Molded articles and films of any kind may be produced in a known manner by means of injection molding or by extrusion. The present Application relates also to molded articles and extrudates produced from the composition according to the invention.

The composition according to the invention are readily soluble in solvents such as chlorinated hydrocarbons, for example methylene chloride, and may thus be processed, for example, in a known manner to cast films.

The combination of properties such as dimensional stability under heat, good low-temperature properties and chemical resistance allows the thermoplastic composition of the invention to be used in a wide range of fields. The following may be mentioned as examples of possible applications of the blends according to the invention, this list in no way being limiting:

1. Safety glazing, which, as is known, is required in many areas of buildings, vehicles and aircraft, as well as the visors of helmets.
2. Production of films, especially ski films.
3. Production of blow-molded articles (see, for example, U.S. Pat. No. 2,964,794), for example 1 to 5 gallon water bottles.
4. Production of transparent sheets, especially of hollow-chamber sheets, for example for covering buildings such as railway stations, greenhouses and lighting installations.
5. Production of optical data storage means.
6. For the production of traffic light housings or road signs.
7. For the production of foamed materials (see, for example, DE-AS 1 031 507).
8. For the production of threads and wires (see, for example, DE-AS 1 137 167 and DE-A 1 785 137).
9. As translucent plastics having a content of glass fibers for lighting purposes (see, for example, DE-A 1 554 020).
10. As translucent plastics having a content of barium sulfate, titanium dioxide and or zirconium oxide or organic polymeric acrylate rubbers (EP-A 634 445, EP-A 269 324) for the production of transparent and light-scattering moldings.
11. For the production of precision injection-molded parts, such as, for example, lens holders. To that end, polycarbonates having a content of glass fibers are used, which optionally contain in addition approximately from 1 to 10 wt. % $MoS_2$, based on the total weight.
12. For the production of parts for optical devices, especially lenses for photographic and film cameras (see, for example, DE-A 2 701 173).
13. As light transmission carriers, especially as fiber-optic cables (see, for example, EP-A1 0 089 801).
14. As electrical insulating materials for electrical conductors and for plug housings as well as plug connectors.
15. Production of mobile phone casings having improved resistance to perfume, aftershave and perspiration.
16. Network interface devices.
17. As carrier material for organic photoconductors.
18. For the production of lamps, for example in the form of headlamps, headlight lenses or internal lenses.
19. For medical applications, for example oxygenators, dialysers.
20. For foodstuffs applications, such as, for example, bottles, kitchenware and chocolate molds.
21. For applications in the automotive sector, where contact with fuels and lubricants may occur, such as, for example, bumpers, optionally in the form of suitable blends with ABS or suitable rubbers.
22. For sports articles, such as, for example, slalom poles or ski boot buckles.
23. For domestic articles, such as, for example, kitchen sinks and letter box casings.
24. For casings, such as, for example, electrical distribution cabinets.
25. Casings for electric toothbrushes and hairdryer casings.
26. Transparent washing machines—bull's-eyes having improved resistance to the washing solution.
27. Safety goggles, optical corrective spectacles.
28. Lamp covers for kitchen appliances having improved resistance to cooking steam, especially oil vapours.
29. Packaging films for medicaments.
30. Chip boxes and chip carriers.
31. For other applications, such as, for example, stable doors or animal cages.

Films in particular may be produced from the high molecular weight aromatic polycarbonate blends according to the invention. The films have preferred thicknesses of from 1 to 1500 μm, particularly preferred thicknesses of from 10 to 900 μm. The resulting films may be stretched monoaxially or biaxially in a manner known per se, preferably in a ratio of from 1:1.5 to 1:5.

The films may be produced by the known processes for producing films, for example by extrusion of a polymer melt through a slit die, by blowing on a film blowing machine, by deep-drawing or casting. It is possible for the films to be used on their own. It is also possible, of course, to use them to produce composite films with other plastics films by the conventional processes, all known films in principle being suitable as partners, depending on the desired application and final property of the composite film. A composite of two or more films may be produced.

In addition, the thermoplastic molding compositions (herein referred to as polycarbonate blends) according to the invention may also be used in other layered systems, such as, for example, in co-extruded sheets.

EXAMPLES

The examples which follow are intended to illustrate the present invention, but without limiting it:

Various polycarbonates were synthesised by the known preparation processes in the melt, as described, for example, in DE 4 238 123, and via the interface, as described, for example, in "Schnell", Chemistry and Physics of Polycarbonates, Polymer Reviews, Vol. 9, Interscience Publishers, New York, London, Sydney 1964, p. 33 ff.

As copolycarbonate (A) there was prepared a polycarbonate containing 30 mol % dihydroxydiphenyl (DOD) and 70 mol % bisphenol A. Tert-butylphenol was used as chain terminator. The granules have a relative solution viscosity of 1.30.

Polycarbonates having various molecular weights, expressed in the relative solution viscosity (eta rel), were used as the bisphenol A polycarbonate (B).

In Example 5, 0, 1 wt. % titanium dioxide (Kronos 2230) was additionally added as additive.

In Comparative Example 2, a copolycarbonate containing 25 mol % dihydroxydiphenyl (DOD) and 75 mol % bisphenol A was prepared. The granules have a relative solution viscosity of 1.30.

The relative solution viscosity was determined in dichloromethane at a concentration of 5 g/l at 25° C.

In order to determine the impact strength, the impact bending test according to ISO 180/4A was used. In that test, ten test specimens were measured in each case. Table 1 shows the value exhibited by the majority of the test specimens.

Compounding to a blend was carried out on a ZSK 32 at 300° C. and with a throughput of 10 kg/h.

The results of the low-temperature strength are summarized in Table 1.

As Table 1 shows, an improvement in the low-temperature strength is achieved with only small amounts of (A) in comparison to the corresponding properties of a homopolycarbonate of bisphenol A. Further additions to the blends do not cancel out the positive effect. By contrast, a copolycarbonate (A) with a lower content of (I) does not show that improvement.

TABLE 1

| Example | Content (A) [wt. %] | Content (B) [wt. %] | Type (B) ηrel | Notched bar impact strength according to ISO 180/4A [kJ/m²] | | | | | |
|---|---|---|---|---|---|---|---|---|---|
| | | | | 0° C. | −20° C. | −30° C. | −40° C. | −50° C. | −60° C. |
| Ex. 1 | 95 | 5 | 1.315 | | 58z | | 57z | 53z | 51z |
| Ex. 2 | 50 | 50 | 1.295 | | 70z | 57z | 70z | | 66z |
| Ex. 3 | 50 | 50 | 1.225 | | 56z | | 56z | 54z | 20s |
| Ex. 4 | 50 | 50 | 1.195 | | 49z | | 45z | 23s | 20s |
| Ex. 5[1)] | 50 | 50 | 1.295 | | 71z | | 71z | 20s | 19s |
| Ex. 6 | 50 | 50 | 1.295 | 68z | 69z | 67z | 66z | 68z | 25s |
| Ex. 7 | 40 | 60 | 1.295 | 72z | 70z | 69z | 69z | 69z | 14s |
| Ex. 8 | 30 | 70 | 1.295 | 75z | 74z | 72z | 73z | 16s | |
| Comp. Ex. 1 | 0 | 100 | 1.296 | 84z | 83z | 13s | | | |
| Comp. Ex. 2 | 100[2)] | 0 | | 46z | 29s | | 19s | | 13s |

Comparison of notched bar impact strength
s = brittle fracture
z = ductile fracture
[1)]with 0.1 wt. % titanium dioxide
[2)](A) with 25 mol % dihydroxydiphenyl Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising (A) 1 to 99 wt. % of a copolycarbonate derived from 0.1 to 46 mol % of compounds of formula (I)

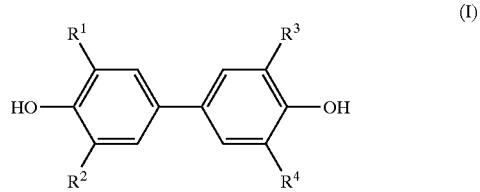

wherein $R^1$ to $R^4$ independently of one another represent H, $C_1$–$C_4$-alkyl, phenyl, substituted phenyl or halogen, and 99.9 to 54 mol %, of compounds of formula (II)

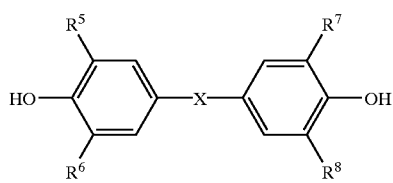

(II)

wherein $R^5$ to $R^8$ independently of the others denote H, $CH_3$, Cl or Br and X is $C_1$–$C_5$-alkylene, $C_2$–$C_5$-alkylidene, $C_5$–$C_6$-cycloalkylene, $C_5$–$C_{10}$-cycloalkylidene, (B) 1 to 99 wt. % of a homopolycarbonate derived from bisphenol A, and (C) one or more auxiliary substances and/or reinforcing agents selected from the group consisting of thermal stabilizers, flow modifiers, mold-release agents, flame retardants, finely divided minerals, fibrous substances, and combinations thereof.

2. The composition of claim 1 wherein (A) is derived from 34 to 26 mol % of compound of formula (I) and 66 to 74 mol % of a compound of formula (II).

3. The molding composition of claim 2 wherein the compound of formula (I) is dihydroxydiphenol and the compound of formula (II) is bisphenol A.

4. The composition of claim 1 wherein (A) is present in an amount of 30 to 95 wt. % and (B) is present in an amount of 70 to 5 wt. %, the percents being relative to the total weight of (A) and (B).

5. A molded article comprising the composition of claim 1.

* * * * *